United States Patent [19]
Satoh

[11] Patent Number: 6,100,612
[45] Date of Patent: Aug. 8, 2000

[54] STEPPING MOTOR

[75] Inventor: Kouichi Satoh, Nagaoka, Japan

[73] Assignee: Nippon Seiki Co., Ltd., Niigata, Japan

[21] Appl. No.: 09/091,854

[22] PCT Filed: Oct. 22, 1997

[86] PCT No.: PCT/JP97/03837

§ 371 Date: Jun. 25, 1998

§ 102(e) Date: Jun. 25, 1998

[87] PCT Pub. No.: WO98/19384

PCT Pub. Date: May 7, 1998

[30] Foreign Application Priority Data

Oct. 25, 1996 [JP] Japan .................................... 8-283570

[51] Int. Cl.$^7$ .......................... H02K 37/14; H02K 11/00
[52] U.S. Cl. ......................................... 310/49 R; 310/71
[58] Field of Search ................................ 310/49 R, 71, 310/162, 164

[56] References Cited

U.S. PATENT DOCUMENTS

| | | | |
|---|---|---|---|
| 4,825,112 | 4/1989 | Mineyama | 310/71 |
| 5,004,941 | 4/1991 | Ohzekt et al. | 310/49 R |
| 5,057,732 | 10/1991 | Fukaya | 310/208 |
| 5,291,084 | 3/1994 | Shiotsuki et al. | 310/49 R |
| 5,698,920 | 12/1997 | Agematsu | 310/254 |
| 5,770,900 | 6/1998 | Sato et al. | 310/49 R |

FOREIGN PATENT DOCUMENTS

| | | |
|---|---|---|
| 60-062883 | 5/1985 | Japan . |
| 61-144759 | 9/1986 | Japan . |
| 4-014476 | 2/1992 | Japan . |
| 4-183257 | 6/1992 | Japan . |
| 5-64411 | 3/1993 | Japan . |
| 7-177693 | 7/1995 | Japan . |
| 8-111971 | 4/1996 | Japan . |
| 8-149728 | 6/1996 | Japan . |
| 8-322230 | 12/1996 | Japan . |

*Primary Examiner*—Clayton LaBalle
*Attorney, Agent, or Firm*—McDermott, Will & Emery

[57] ABSTRACT

A stepping motor that facilitates separate winding of annular bobbins of annular stator cores while preventing current-carrying terminals from acting as a bar to the winding work is provided. The stepping motor includes first and second annular stator cores (4, 5) having respective annular bobbins (42, 52) wound with first and second exciting coils (41, 51) around winding sections (45, 55), respectively, and a rotor (3) having a rotation shaft (32) within a concentrical lamination structure of the first and second stator cores (4). A first current-carrying terminal (8) having a first connector section (81) and a second connector section (82) conductively secured to a termination end (41a) of the first exciting coil so as not to obstruct the outer periphery of the winding section (45) is secured to the annular bobbin (42). A second current-carrying terminal (9), having a first connector section (91) for fixation and electrical connection of a termination end (51a) of the second exciting coil (51) while preventing obstruction of the outer periphery of the winding section (55), and a second connector section (92) electrically connected to a circuit board placed in the axial direction of the rotor (3), is secured to the annular bobbin (52). A third current-carrying terminal (10), having a first connector section (101) electrically connected to the second connector section (83) of the first current-carrying terminal (8) and a second connector section (102) electrically connected to the circuit board (2), is also secured to annular bobbin (52).

3 Claims, 3 Drawing Sheets

STEPPING MOTOR

TECHNICAL FIELD

The present invention relates to stepping motors with two sets of stator cores having exciting coils, and more particularly to the conducting structure of exciting coils.

BACKGROUND ART

Conventionally, stepping motors of the PM (permanent magnet) type, for example, have been widely employed as actuator components in a variety of kinds of industrial fields, most of which stepping motors are comprised of a rotor having a permanent magnet in the hollow space of two sets of annular stator cores with exciting coils exhibiting the magnetic action for rotation-drive of the rotor; recently, the stepping motors are becoming more important for use also as drive sources for analog measurement instruments due to the fact that such motors are less in dimension and yet significant in drive torque.

One typical stepping motor of this type has been disclosed in, for example, Published Unexamined Japanese Patent Application (PUJPA) No. 5-64411 and PUJPA No. 8-111971, wherein the stepping motors disclosed are designed to include two annular bobbins with exciting coils each wound for a corresponding annular stator core while securing a plurality of current-carrying terminals to these annular bobbins to thereby provide electrical connections with respective exciting coils and a circuit board via the current-carrying terminals.

Incidentally, the former of those disclosed in said Japanese documents is designed so that the current-carrying terminals are distributed for fixation to the annular bobbin of each annular stator core, whereas the latter of them is such that the current-carrying terminals are concentrically secured together to the annular bobbin of certain one of respective annular stator cores, which is one-side (upper-side) annular stator core.

However, the former of those motors disclosed in said Japanese documents with the current-carrying terminals residing dispersedly is disadvantageous in that when winding and mounting the exciting coil around the one-side (lower-side) annular bobbin, certain part of the current-carrying terminals must obstruct the outer periphery of a winding section so that the current-carrying terminals badly behave as a bar to the exciting coil windings, which should require that an extra winding-work area be provided or reserved by causing such current-carrying terminal part serving as a bar to be spaced far from the annular bobbin, which would result in an increase in size. On the other hand, the latter of the stepping motors disclosed in the Japanese documents with the current-carrying terminals being disposed concentrically is such that since no current-carrying terminals are provided at the annular bobbin of the other side (lower side) of annular stator core of respective annular stator cores , no parts are present for supporting the termination end of such exciting coil, which in turn makes it difficult to independently execute winding at the annular bobbin of the other-side (lower-side) annular stator core to thereby necessitate execution of winding after combination of respective stator cores (annular bobbins), thus resulting in a decrease in assembly efficiency while having to allow the current-carrying terminal provided to the annular bobbin of the one-side (upper-side) annular stator core to badly act as a bar to winding on the annular bobbin of the otherside (lower-side) annular stator core, which leads to the necessity of letting such part of the current-carrying terminal acting as a bar to winding be significantly separated from the annular bobbin thereby increasing the size as in the case of the former motor disclosed in the Japanese document stated supra.

The present invention has been made in view of the above points, and one primary object is to provide a stepping motor capable of increasing the assembly work efficiency and yet avoiding an increase in size by facilitating mounding at separate winding steps an exciting coil with respect to the annular bobbin of each annular stator core while increasing the winding work efficiency by preventing current-carrying terminals from acting as a bar to such winding works.

DISCLOSURE OF THE INVENTION

The present invention provides a stepping motor characterized by comprising a first annular stator core having an annular bobbin with a first exciting coil being wound around the outer periphery of a hollow cylindrical winding section, a second annular stator core having an annular bobbin with a second exciting coil wound around the outer periphery of a hollow cylindrical winding section, a rotor disposed within the winding section of each of said annular bobbins as mutually associated inside a concentrically stacked structure of these first and second stator cores and having a rotation shaft which is rotatable by the magnetic action of said first and second exciting coils, a first current-carrying terminal secured to the annular bobbin of one-side annular stator core of those of said respective annular stator cores in a way such that it does not obstruct the outer periphery of said winding section and being electrically connected to the termination end of said exciting coil of said one-side annular stator core and an external electrical device as placed in the axial direction of said rotor, and a second current-carrying terminal secured to the annular bobbin of the other-side annular stator core of said respective annular stator cores so as not to obstruct the outer periphery of said winding section and being electrically connected to the termination end of said exciting coil of said the other-side annular stator core and said external electrical device.

The present invention also provides a stepping motor characterized by comprising a first annular stator core having an annular bobbin with a first exciting coil being wound around the outer periphery of a hollow cylindrical winding section, a second annular stator core having an annular bobbin with a second exciting coil wound around the outer periphery of a hollow cylindrical winding section, a rotor disposed within the winding section of each of said annular bobbins as mutually associated inside a concentric lamination structure of these first and second stator cores and having a rotation shaft rotatable by the magnetic action of said first and second exciting coils, a first current-carrying terminal secured to the annular bobbin of one-side annular stator core of those of said respective annular stator cores in a way such that it does not obstruct the outer periphery of said winding section and having a first connection section conductively secured to a termination end of said exciting coil of said one-side annular stator core and a second connection section, a second current-carrying terminal secured to the other-side annular stator core of those of said respective annular stator cores so that it does not obstruct the outer periphery of said winding section and having a first connection section for conductive fixation of the terminal end of said excitingcoil of said the other-side annular stator core and a second connection section as electrically connected to an external electrical device placed in the axial direction of said rotor, and a third current-carrying terminal secured to the annular bobbin of said other-side stator core along with said second current-carrying terminal so as not to obstruct the outer periphery of said winding section and having a first connection section electrically connected to the second connection section of said first current-carrying terminal and a second connection section electrically connected to said external device.

The present invention is further characterized in that each of the first connection sections of said first and second plus third current-carrying terminals extends in the direction substantially perpendicular to the axial direction of said rotor while both of the second connection sections of said second and third current-carrying terminals extend along the axial direction of said rotor thus causing their ends to be electrically connected to said external device, wherein the relative positions of the second connection section of said first current-carrying terminal and the first connection section of said third current-carrying terminal are substantially equal to each other in the lamination direction of said annular stator cores.

The present invention is further characterized in that both of the second connection sections of said second and third current-carrying terminals penetrate the winding section of the annular bobbin of said the other-side stator core to have a penetrated end side electrically connected to said external device.

BEST MODES FOR CARRYING OUT THE INVENTION

Preferred embodiments of the present invention will be explained based on the accompanying drawings below.

Figure 1:
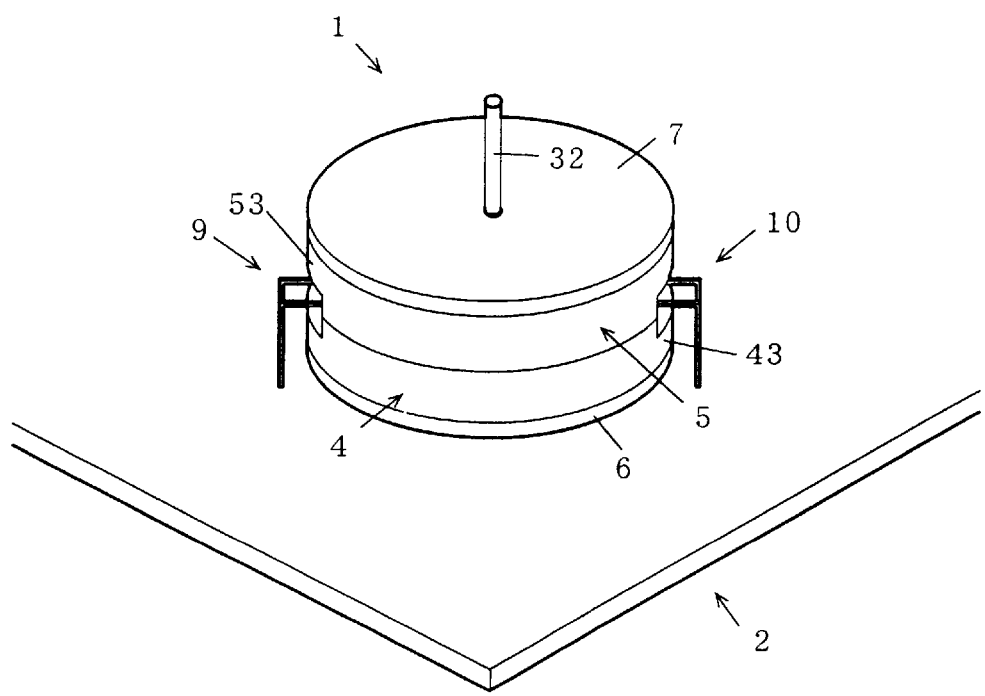
FIG. 1 is a diagram showing a perspective view of a stepping motor in accordance with a first embodiment of the present invention.
Figure 2:
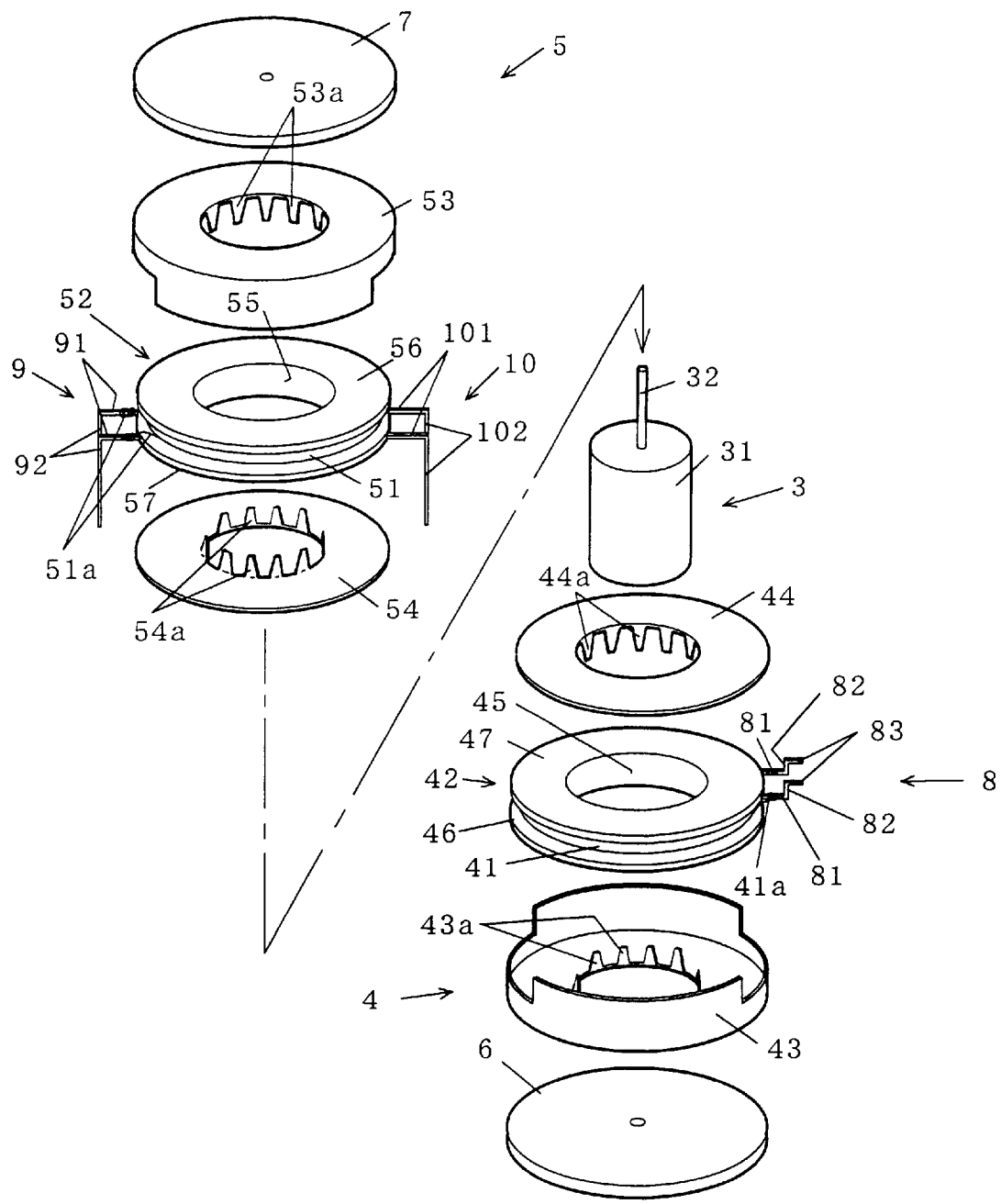
FIG. 2 is an exploded perspective view of the stepping motor of FIG. 1.
Figure 3:
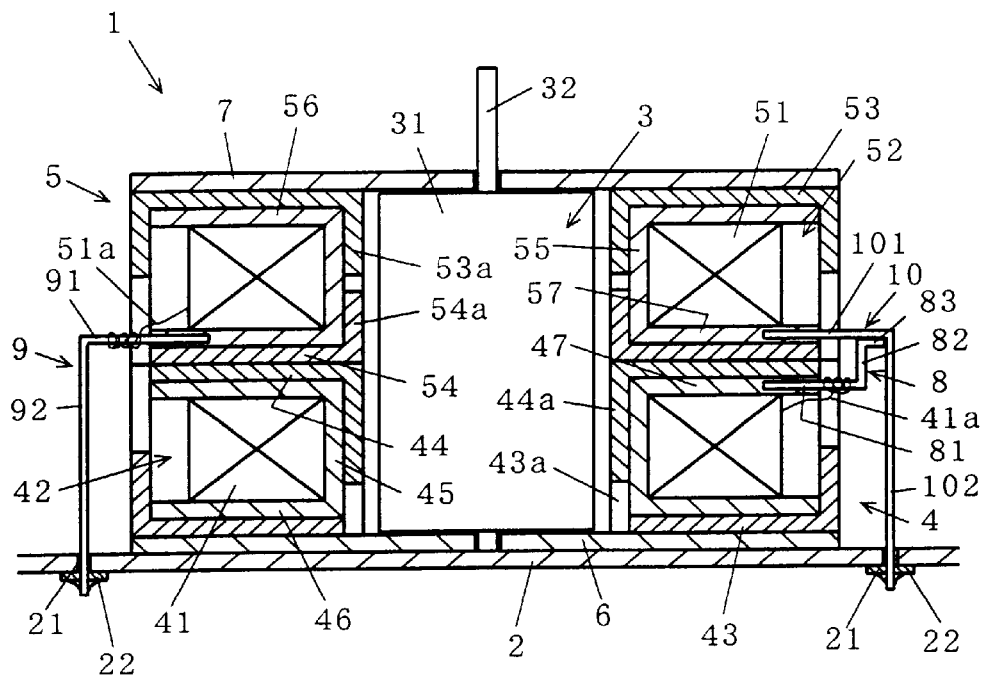
FIG. 3 is a cross-sectional view of FIG. 1.

FIG. 1 is a diagram showing a perspective view of a stepping motor in accordance with a first embodiment of the present invention, which includes a circuit board as an external device; FIG. 2 depicts an exploded perspective view of the stepping motor of FIG. 1; FIG. 3 is a sectional view of a stator including a circuit board.

As shown in FIG. 1, a stepping motor 1 in accordance with the illustrative embodiment is of the PM type for example, which is mounted on a circuit board 2 along the axis direction of a rotor to be later described and also is electrically connected in a way as will be described later.

Firstly, as shown in FIG. 2, the stepping motor 1 is structured from a rotor 3, a first annular stator core (one-side annular stator core) 4 and second annular stator core (the other-side annular stator core) 5 for constituting a concentric lamination structure to be internally housed so as to surround the periphery of this rotor 3, and first and second support members 6, 7 which are disposed to oppose each other with the annular stator cores 4, 5 being laid therebetween along the axial direction of the rotor 3 for supporting the rotor 3 within respective annular stator cores 4, 5.

The rotor 3 is comprised of a permanent magnet 31 having a plurality of magnetic poles of N and S polarities that are alternately disposed along the rotation direction around the peripheral surface thereof, and a rotation shaft 32 as secured penetrating the center of this permanent magnet 31 in the axial direction thereof, wherein the rotor is rotatably held at the first and second support members 6, 7 via the rotation shaft 32.

The first annular stator core 4 consists essentially of an annular bobbin 42 with a first exciting coil 41 wound therearound, an outer yoke 43 of the substantially circular cup-like shape that is made of a magnetic metal material, and an inner yoke 44 of a substantially round annular plate-like shape being similarly made of a magnetic metal material, wherein these outer and inner yokes 43, 44 are concentrically stacked or laminated letting the annular bobbin 42 be sandwiched between them.

The annular bobbin 42 is provided with a hollow cylindrical winding section 45 housing therein part of the rotor 3 (permanent magnet 31) and having a first exciting coil 41 wound around its outer peripheral surface, flange sections 46, 47 which is formed to provide a pair on the opposite outer peripheral surfaces in the axial direction of this winding section 45 (in the axis direction of the rotor 3) and which also functions as a winding guide when winding the first exciting coil 43; simultaneously, a pair of first current-carrying terminals 8 are provided at the flange section 47 with termination ends 41a of the first exciting coil 41 being conductively secured thereto.

The winding section 45 has its inner wall along which a plurality of pole teeth 41a, 42a as formed at the outer and inner yokes 41, 42 are housed and aligned; in this case, the pole teeth 41a, 42a are designed so that these are combined together while having an annular comb-tooth type alignment shape that is slightly larger than the outer diameter of the permanent magnet 31 of the rotor 3 within the winding section 45, and simultaneously are disposed opposing said magnetic poles of the rotor 3 with a predetermined distance defined therebetween.

The first current-carrying terminal 8 has its one end secured by insert-machining techniques to the flange section 47 of the annular bobbin 42, and has a first connector section 81 that extends in the direction substantially perpendicular to the axis direction of the rotor 3 and permits the termination end 41a of the first exciting coil 41 to be fixed and conducted thereto by bending and soldering the termination end 41a of the first exciting coil 41, and a second connector section 83 which extends from this first connector section 81 along the axis direction of the rotor 3 and further extends in the direction almost perpendicular to the axial direction of the rotor 3 to be electrically connected to a third current-carrying terminal that will be later described, wherein the terminal is provided for the annular bobbin 42 in such a way that it does not obstruct the outer circumferential part of its winding section 45.

The second annular stator core 5 has a substantially similar structure to that of the first annular stator core 4, and is comprised of an annular bobbin 52 with a second exciting coil 51 wound therearound, an outer yoke 53 of a substantially annular cup-like shape made of a magnetic metallic material, and an inner yoke 54 of a substantially round annular plate shape being similarly made of a magnetic metal material, wherein these outer and inner yokes 53, 54 are concentrically laminated above each other with the annular bobbin 52 laid therebetween.

The annular bobbin 52 is continuously coupled to inside of the winding section 45 of the annular bobbin 42 of the first annular stator core 4 in the assembled/attached state, and includes a hollow cylindrical winding section 55 housing therein part of the rotor 3 (permanent magnet 31) and having a second exciting coil 51 on the outer periphery thereof, and flange sections 56, 57 which are formed to make a pair on the opposite outer peripheries of this winding section 55 in the axial direction and which have a function of a winding guide when winding the second exciting coil 51, wherein there are provided in the flange section 57 a pair of second current-carrying terminals 9 to which the termination ends 51a of the second exciting coil 51 are secured and conducted and a third current-carrying terminal 10 to be later.

The winding section 55 has its inner wall along which a plurality of pole teeth 53a, 54a as formed at the outer and inner yokes 53, 54 are aligned; in this case, the pole teeth 53a, 54a are designed so that they are combined together while having an annular comb-tooth type alignment shape slightly larger than the outer diameter of the permanent magnet 31 of the rotor 3 within the winding section 55, and are also disposed opposing said magnetic poles of the rotor 3 with a predefined distance left therebetween.

The second current-carrying terminal 9 has its one end secured by insert-machining techniques to the flange section 57 of the annular bobbin 52, and has a first connector section 91 that extends in a direction substantially perpendicular to the axis direction of the rotor 3 and causes the termination end 51a of the second exciting coil 51 to be conductively fixed thereto by bending and soldering the termination end 51a of the second exciting coil 51, and a second connector section 92 which extends from this first connector section 91 along the axis direction of the rotor 3 letting its distal end be electrically connected to the circuit board 2, wherein the terminal is provided for the annular bobbin 52 in a way such that it does not obstruct the outer periphery the winding section 45 thereof.

The third current-carrying terminal 10 has its one end that is fixed by insert-machining techniques at a position of the flange section 57 different by about 180degrees from the second current-carrying terminal 9, which position corresponds to the first current-carrying terminal 8 in the axial direction of the rotor 3, and has a first connector section 101 that extends in the direction substantially perpendicular to the axis direction of the rotor 3 to be electrically connected by soldering to the first connector section 81 of the first current-carrying terminal 8, and a second connector section 102 extending from this first connector section 101 along the axis direction of the rotor 3 to be electrically connected at its distal end to the circuit board 2, wherein the terminal is similar to the second current-carrying terminal 9 in that it is provided so as not to obstruct the outer circumferential periphery of the winding section 55 in the annular bobbin 52.

Next, as shown in FIG. 3, the circuit board 2 has throughgoing holes 21 for insertion of distal end sides of the second connector sections 92, 102 of the second and third current-carrying terminals 9, 10; conductive sections 22 of the land shape are formed around these through-holes 21; and, these conductive sections 22 are electrically connected to a motor drive circuit not illustrated herein via a circuit pattern that is neither depicted herein. And, the second connector sections 92, 102 of the second and third current-carrying terminals 9, 10 as inserted into the through-holes 21 are connected by soldering to the conductive sections 22.

An explanation will next be given of a work procedure of winding the exciting coils 41, 51 onto respective annular bobbins 42, 52.

The winding works to respective annular bobbins 42, 52 are separately carried out with respect to each of the annular bobbins 42, 52 by use of an automatic winding machine, and will be summarized as follows. First of all, after curling and temporarily securing either the wind starting end 41a of the exciting coil 41 projecting from a flyer not illustrated or the termination end 51a on the wind start end side of the exciting coil 51 to either the first connector section 81 of any one of the first current-carrying terminals 8 of the annular bobbin 42 or the first connector section 91 of any one of the first current-carrying terminals 9 of the annular bobbin 52, winding of the exciting coils 41, 51 is performed for respective winding sections 45, 55 while permitting said flyer to rotate at high speeds around either the outer periphery of the winding section 45 of the annular bobbin 42 or the outer periphery of the winding section 55 of the annular bobbin 52; when the winding to each winding section 45, 55 is completed, either the terminate end 41a or terminate end 51a on the wind ending side of respective exciting coils 41, 51 is curled for temporal fixation to either the first connector section 81 of the other of the first current-carrying terminals 8 of the annular bobbin 42 or the first connector section 91 of the other of the first current-carrying terminals 9 of the annular bobbin 52, and is then cut away. And, either the termination ends 41a on the wind-start side and the wind-end side of the exciting coil 41 which have been temporarily secured respectively or the temporarily secured termination ends 51a on the wind-start side and the wind-end side of the exciting coil 51 are conductively secured by soldering thereby completing the intended work.

Next, an example of assembly of the stepping motor 1 in accordance with the illustrative embodiment will be explained below.

Firstly, the annular bobbins 42, 52 with the first and second exciting coils 41, 51 wound therearound and respective outer and inner yokes 43, 53, 44, 55 are concentrically stacked and secured in the order of sequence as depicted in FIG. 2, thereby providing a concentric lamination structure of the first and second annular stator cores 4, 5. When this is done, the first and second annular stator cores 4, 5 may be separately assembled; or alternatively, the first and second annular stator cores 4, 5 may be provided after sequentially assembling the yokes in a way such that the outer yoke 43 placed at the lower position in FIG. 2 is first assembled and the outer yoke 53 placed at the upper position is last assembled. Next, store or house the rotor 3 in the interior of the resultant concentrical lamination structure of the first and second annular stator cores 4, 5 (inside of the winding sections 45, 55 of respective annular bobbins 42, 52). Next, secure the first and second support members 6, 7 to the concentric lamination structure of the first and second annular stator cores 4, 5; then, axially support the rotation shaft 32 of the rotor 3 by these first and second support members 6, 7. Next, conductively connecting together the second connector section 83 of the first current-carrying terminal 8 and the first connector section 101 of the third current-carrying terminal 10 via cut-away portions (see FIG. 2) of respective outer yokes 43, 53 whereby the stepping motor 1 is completed as shown in FIG. 3, wherein it is noted that the connection works of the first current-carrying terminal 8 and the third current-carrying terminal 10 may be performed when assembling respective annular stator cores 4, 5 together, or alternatively, may be done while the yokes are sequentially assembled in the order of from the outer yoke 43 placed on the lower side up to the outer yoke 53 placed on the upper side.

The stepping motor 1 thus completed in the way described above is mounted onto the circuit board 2, then causing the second connector sections 92, 102 of the second and third current-carrying terminals 9, 10 to be connected by soldering to the conductors 22.

As has been described above, according to the illustrative embodiment, the stepping motor is comprised of the first and second annular stator cores 4, 5 having respective annular bobbins 42, 52 with the first and second exciting coils 41, 51 being wound respectively on the outer peripheries of the hollow cylindrical winding sections 45, 55, and the rotor 3 having the rotation shaft 32 as disposed within the winding sections 45, 55 of the annular bobbins 42, 52 mutually coupled in the concentric lamination structure of these first and second annular stator cores 4, 5, wherein the first current-carrying terminal 8 having the first connector section 81 and second connector section 82 as conductively secured to the termination end 41*a* of the first exciting coil in such a way as not to obstruct the outer periphery of the winding section 45 is rigidly attached to the annular bobbin 42 of the first annular stator core (one-side annular stator core) 4 of those of respective annular stator cores 4, 5, while securing the second current-carrying terminal 9, which has the first connector section 91 for conductive fixation of the termination end 51*a* of the second exciting coil 51 so as not to obstruct the outer periphery of the winding section 55 and the second current-carrying terminals 9 as electrically connected to the circuit board (external electrical device) placed in the axis direction of the rotor 3, to the annular bobbin 52 of the second annular stator core (the other-side annular stator core) 5 of those of respective annular stator cores 4, 5, and while securing to the annular bobbin 52 of this second annular stator core 5 the third current-carrying terminal 10 which has the first connector section 101 as electrically connected to the connector section 83 of the first current-carrying terminal 8 in a way such that it does not obstruct the outer periphery of the winding section 55 and the second connector section 102 being electrically connected to the circuit board 2, whereby the first exciting coil 41 of the first and second exciting coils is electrically connected to the circuit board 2 through the first current-carrying terminal 8 (first connector section 81, second connector section 82) → the third current-carrying terminal 10 (first connector section 101, second connector section 102), whist the second exciting coil 51 of the first and second exciting coils is electrically connected to the circuit board 2 through the second current-carrying terminal 9 (first connector section 91, second connector section 92) to thereby permit the first current-carrying terminal 8 to hold the termination section 41*a* of the first exciting coil 41 and also function as a repeater terminal for electrical connection between the first exciting coil 41 and the third current-carrying terminal 10; accordingly, it becomes possible to prevent the first to third current-carrying terminals from acting as a bar to winding works while simultaneously making it easy to separately wind the exciting coils 41, 51 around the annular bobbins 42, 52 of respective annular stator cores 4, 5, which in turn enables enhancement of the work efficiency of assembly of the stepping motor 1 and also increase of the efficiency of winding works, and further enables elimination of unwanted enlargement of the stepping motor 1 in the axial direction because of the fact that the first to third current-carrying terminals 8, 9, 10 in particular, the second connector sections 92, 102 of the second and third current-carrying terminals 9, 10 will no longer act as a bar to the winding works.

In addition, it is possible to reduce in size the electrical connection structure using the first current-carrying terminal 8 and the third current-carrying terminal 10 due to the fact that respective first connector sections 81, 91, 101 of the first to third current-carrying terminals 8, 9, 10 extend in the direction almost perpendicular to the axis direction of the rotor 3, while the second connector sections 92, 102 of both of the second and third current-carrying terminals 9, 10 extend along the axial direction of the rotor 3 thus letting their ends be electrically connected to the circuit board 2, wherein the mutual positions of the second connector section 83 of the first current-carrying terminal 8 and the first connector section 101 of the third current-carrying terminal 10 are substantially identical in lamination direction (axis direction of rotor 3) of respective annular stator cores 4, 5 stacked above each other.

Figure 4:
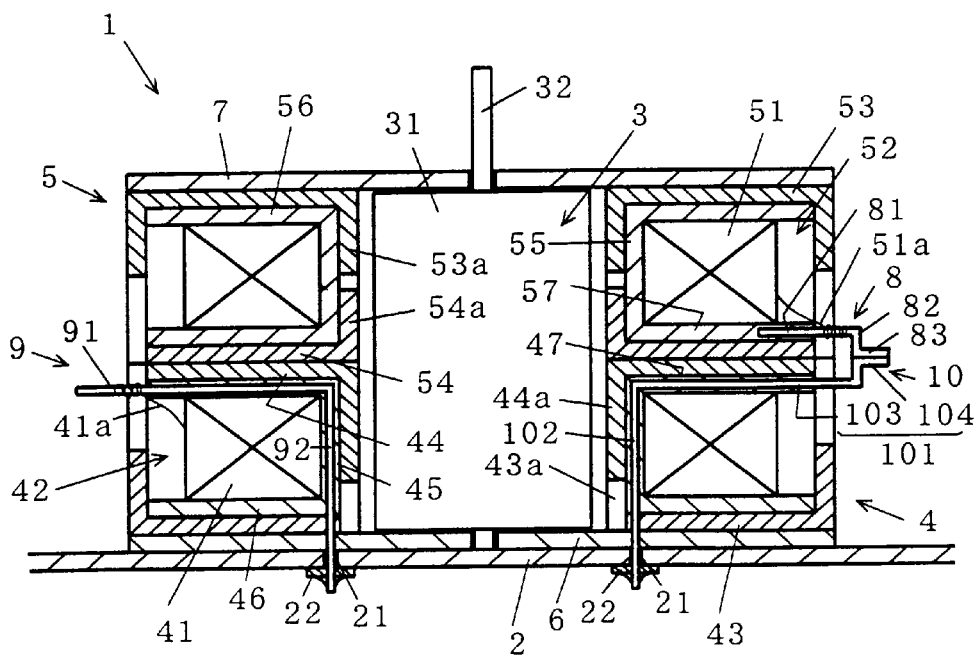
FIG. 4 is a cross-sectional view showing a second embodiment.

FIG. 4 is a diagram showing in cross-section a second embodiment of the present invention, wherein this embodiment is configured so that the second and third current-carrying terminals 9, 10 are disposed at the annular bobbin 42 of the first annular stator core (other-side annular stator core) 4 at the lower part, the first current-carrying terminal 8 is disposed at the annular bobbin 52 of the second annular stator core (one-side annular stator core) 5 at the upper part, the second connector sections 92, 102 of both of the second and third current-carrying terminals 9, 10 penetrate the wall inside of the winding section 45 of the annular bobbin 42, its penetration side is connected to the circuit board 2, and the first connector section 101 of the third current-carrying terminal 10 is formed into a crank-like shape similar to that of the first current-carrying terminal 8, while providing a terminal section 103 for connection of the termination end 41*a* of the first exciting coil 41 and a terminal section 104 as connected to the third connector section 83 of the first current-carrying terminal 8, the remaining portions being similar to those of said first embodiment. Note that although in this embodiment the first current-carrying terminal 8 also is formed into the crank-like shape, the first current-carrying terminal 8 may alternatively be formed to have a straight shape while letting only the third current-carrying terminal 10 be formed into such crank-like shape with the first connector section 81 and second connector section 83 being structured as common part.

With such an arrangement also, similar effect to that of said first embodiment may be obtained while further miniaturizing the electrical connection structure electrically coupled to respective exciting coils 41, 51 via the first to third current-carrying terminals 8, 9, 10. Especially, in the case of this embodiment, the current-carrying terminals 9, 10 are formed by insert-machining techniques at the winding section 45 of the first annular stator core 4; in this respect, where the current-carrying terminal is inserted into the winding section of the annular bobbin in this way, securing the first current-carrying terminal 8 to the annular bobbin 52 is advantageous in view of winding works because it is impossible to insert the current-carrying terminal into each of the both annular stator cores 4, 5 (in this case, also to the winding section 55 of the annular bobbin 52 of the second annular stator core 5).

It should be noted that while in said first and second embodiments the first to third current-carrying terminals 8, 9, 10 are formed into a square-rod or prism-like shape, these may alternatively be formed to have either a column-like shape or plate-like shape; additionally, although not particularly depicted as a third embodiment, at least either one of the second connector section 83 of the first current-carrying terminal 8 and the first connector section 101 (104) of the third current-carrying terminal 10 may be formed to have an increased width thus facilitating position alignment and connection works of the both current-carrying terminals 8, 10.

It is also noted that although not illustrated herein as a fourth embodiment, said first embodiment may be modified in a way such that a through-going portion is provided in the second connector section 83 of the first current-carrying terminal 8 causing the second connector section 102 of the third current-carrying terminal 10 to penetrate this throughgoing part, which is electrically connected by soldering together with the second connection section 102 of the third current-carrying terminal 10. In this case, the second connector section 102 of the third current-carrying terminal 10 will also have the function of the first connector section 101.

It is further noted that although not depicted herein as a fifth embodiment, said second embodiment may be modified such that any one of the first connection section 101 of the third current-carrying terminal 10 and the second connection section 83 of the first current-carrying terminal 8 is formed into a female terminal shape for insertion of the other of them thereinto, thereby attaining conduction of the first and second connector terminals 8, 10.

It is still further noted that although not shown as a sixth embodiment, the current-carrying terminal of the reverse L-like shape as conductively secured to the lower-side exciting coil is insert-machined to the annular bobbin placed on the lower sideas in the second current-carrying terminal 9 shown in FIG. 4, whereas the current-carrying terminal of the reverse L-like shape as conductively secured to the upper-side exciting coil is provided at the annular bobbin placed on the upper side as in the second current-carrying terminal 9 shown in FIG. 3.

It is finally noted that although in the first to fourth embodiments the electrical connection between the first and third current-carrying terminals 8, 10 was done by soldering, the invention should not exclusively be limited to such soldering and may alternatively be such that the electrical connection between the two is attainable by means of calking techniques.

Industrial Applicability

The present invention is applicable to two-phase permanent magnet type stepping motors for use as drive sources in a variety of types of devices or apparatus.

I claim:

1. A stepping motor characterized by comprising a first annular stator core having an annular bobbin with a first exciting coil being wound around the outer periphery of a hollow cylindrical winding section, a second annular stator core having an annular bobbin with a second exciting coil wound around the outer periphery of a hollow cylindrical winding section, a rotor disposed within the winding section of each of said annular bobbins as mutually associated inside a concentric lamination structure of these first and second stator cores and having a rotation shaft rotatable by the magnetic action of said first and second exciting coils, a first current-carrying terminal secured to the annular bobbin of one-side annular stator core of those of said respective annular stator cores in a way such that it does not obstruct the outer periphery of said winding section and having a first connection section conductively secured to a termination end of said exciting coil of said one-side stator core and a second connection section, a second current-carrying terminal secured to the other-side annular stator core of those of said respective annular stator cores so that it does not obstruct the outer periphery of said winding section and having a first connection section for conductive fixation of the terminal end of said exciting coil of said the other-side annular stator core and a second connection section as electrically connected to an external electrical device placed in the axial direction of said rotor, and a third current-carrying terminal secured to the annular bobbin of said other-side stator core along with said second current-carrying terminal so as not to obstruct the outer periphery of said winding section and having a first connection section electrically connected to the second connection section of said first current-carrying terminal and a second connection section electrically connected to said external device.

2. The stepping motor as recited in claim 1, characterized in that each the first connection section of said first and second plus third current-carrying terminals extends in a direction substantially perpendicular to the axial direction of said rotor while both of the second connection sections of said second and third current-carrying terminals extend along the axial direction of said rotor causing the ends thereof to be electrically connected to said external device, the relative positions of the second connection section of said first current-carrying terminal and the first connection section of said third current-carrying terminal being substantially equal to each other in the lamination direction of said annular stator cores.

3. The stepping motor as recited in claim 2, characterized in that both of the second connection sections of said second and third current-carrying terminals penetrate the winding section of the annular bobbin of said the other-side stator core to have a penetrated end side electrically connected to said external device.

* * * * *